Patented Dec. 5, 1933

1,937,861

UNITED STATES PATENT OFFICE 1,937,861

ADHESIVE COMPOSITION AND METHOD OF MAKING SAME

William F. Zimmerli, Fairlawn, and Robert S. Havenhill, Akron, Ohio, assignors, by direct and mesne assignments, of one-half to The B. F. Goodrich Company, New York, N. Y., a corporation of New York, and one-half to Chrysler Corporation, Highland Park, Mich., a corporation of Delaware No Drawing. Application July 17, 1929
Serial No. 379,064

25 Claims. (Cl. 87—17)

This invention relates to adhesive compositions, and particularly to plastic adhesive compositions which permanently retain their plasticity and adhesive quality, even at elevated temperatures or when subjected to moisture.

This application is a continuation in part of the copending application of Zimmerli and Havenhill, Serial No. 269,601 filed April 12, 1928.

This invention has for its object the preparation of adhesive compositions which are readily and cheaply prepared, but which possess a high degree of strength, plasticity and tackiness at normal or elevated temperatures and which are not greatly affected by moisture.

The adhesive compositions of this invention comprise mixtures of reclaimed rubber with an approximately equal quantity of a saponifiable resin, gum-resin, or ester gum, or with a mixture of two or more of such resins or resinous substances, and with a small proportion of a metal oxide or hydroxide which is capable of reacting with fatty acids to form water-insoluble soaps. For example, the oxides (or hydroxides) of magnesium, calcium, strontium, barium, aluminum, iron, lead, zinc, cadmium, etc. are suitable.

The metal oxide apparently reacts with the resin to form a water-insoluble soap which increases the water resistance of the composition and increases its strength, both at normal temperatures and at elevated temperatures, without reducing its adhesiveness. The same effect may be secured by preparing the insoluble soap separately by the reaction of the metal oxide with the requisite amount of the resin or other equivalent substance consisting largely of fatty acids or fatty acid anhydrides, the soap then being added to the reclaimed rubber-resin mixture.

However, it is preferred to add the metal oxide directly and form the soap within the mixture, for reasons of economy and convenience, as well as for the reason that a more perfect and intimate union of the ingredients is attained. The proportion of metal oxide which may be added depends to some extent on the exact proportions of reclaimed rubber and of the resinous ingredient as well as on the particular character and properties of the ingredients and on the nature of the metal oxide itself, but ordinarily about 5% of the oxide is sufficient. Very large proportions of the metal oxide are not preferred, since the solubility of the metal soaps in the mixture of reclaimed rubber and resin is somewhat limited, especially when the product is thinned with a volatile solvent.

The reclaimed rubber may be prepared from vulcanized soft rubber by any convenient method. Reclaimed rubber of high rubber content such as reclaimed inner tubes from automobile tires for example has proven particularly suitable.

The resinous product which is mixed with the reclaimed rubber should be miscible therein in all proportions, soluble in the same solvents (gasoline, benzene, etc.) and insoluble in water, and should preferably contain a considerable proportion of free acid capable of combining with basic metal oxides. The substances fulfilling these conditions include ordinary rosin, rosin esters (ester gum), and gum-resins such as the copals.

The mixing process may be performed in any desired manner but because of the nature of the materials is conveniently performed in a heated internal mixer. The best results are secured when the resinous material is slowly worked into the reclaimed rubber, the metal oxide being added at any convenient stage of the mixing process. The mixture may be transferred to a cement churn before the solvent is added.

*Example 1.*—As a specific example of one embodiment of this invention 100 parts by weight of reclaimed inner tubes are mixed with 100 parts of rosin and 5 parts of powdered quick-lime. The mixture is thinned with 300 parts of gasoline. The resulting cement is an excellent adhesive, adhering permanently to wood, metal, glass, fabric, leather, rubber, etc. It is particularly useful for affixing vulcanized rubber matting to floors, etc., since the adhesion is not appreciably affected by moisture nor by the heat of the summer sun. Similar results are secured when magnesia or litharge is substituted for the lime.

*Example 2.*—A mixture is prepared containing 100 parts by weight of reclaimed rubber, 75 parts of rosin and 25 parts of calcium resinate, thinned with 300 parts of gasoline. The product may be employed for the same purposes as that of Example 1 above.

While we have herein disclosed certain preferred manners of performing our invention, we do not thereby desire or intend to limit ourselves solely thereto, for, as hitherto stated, the precise proportions of the materials utilized may be varied and other materials having equivalent chemical properties may be employed if desired without departing from the spirit and scope of the invention as defined in the appended claims.

We claim:

1. The method of producing a non-aqueous adhesive composition which comprises combining approximately equal proportions of reclaimed rubber and a saponifiable resinous substance, in the presence of a small proportion of a water-insoluble soap.

2. The method of producing a non-aqueous adhesive composition which comprises combining approximately equal proportions of reclaimed rubber and a substance selected from the class consisting of saponifiable resins, gum-resins, and ester gums in the presence of a small proportion of a water-insoluble soap.

3. The method of producing a non-aqueous adhesive composition which comprises combining approximately equal proportions of reclaimed rubber and a saponifiable resinous substance, in the presence of a small proportion of a metal oxide or hydroxide capable of reacting with fatty acids to form water-insoluble soaps.

4. The method of producing a non-aqueous adhesive composition which comprises combining approximately equal proportions of reclaimed rubber of high rubber content and a saponifiable resin, in the presence of a small proportion of an oxide or hydroxide of an alkaline earth metal.

5. The method of producing a non-aqueous adhesive composition which comprises combining approximately equal proportions of reclaimed rubber of high rubber content and rosin, in the presence of a small proportion of the oxide or hydroxide of an alkaline earth metal.

6. A non-aqueous adhesive composition comprising approximately equal proportions of reclaimed rubber and of a saponifiable resinous substance, and a small proportion of a water-insoluble soap.

7. A non-aqueous adhesive composition comprising approximately equal proportions of reclaimed rubber and of a saponifiable resinous substance, and a small proportion of a water-insoluble soap.

8. A non-aqueous adhesive composition comprising approximately equal proportions of reclaimed rubber and rosin, and a small proportion of a water-insoluble soap.

9. A non-aqueous adhesive composition comprising approximately equal proportions of reclaimed rubber of high rubber content and rosin, and a small proportion of a soap of an alkaline earth metal.

10. A non-aqueous adhesive composition comprising approximately equal proportions of reclaimed rubber of high rubber content and rosin, and a small proportion of a lime soap.

11. An adhesive cement consisting in its unset state mainly of a solution including a substantial quantity of a resinate of a metal of the alkaline earth group, rosin and rubber.

12. An adhesive cement consisting in its unset state mainly of a solution including calcium resinate, rosin and rubber.

13. The process of making an adhesive cement including in its unset state a solution of rubber, rosin, and a resinate of a metal of the alkaline earth group which consists in incorporating together undissolved rosin and undissolved rubber, reacting an alkaline derivative of a metal of the alkaline earth group with the rosin while the latter is incorporated with the rubber to form a resinate of a metal of the alkaline earth group, and then reducing the viscosity of the resulting product thereafter by the addition of a suitable solvent.

14. The process of making an adhesive cement including in its unset state a solution of rubber, rosin, and calcium resinate which consists in incorporating together undissolved rosin and undissolved rubber, reacting an alkaline derivative of calcium with the rosin while the latter is incorporated with the rubber to form calcium resinate, and then reducing the viscosity of the resulting product thereafter by the addition of a suitable solvent.

15. The process of making an adhesive cement including in its unset state a solution of rubber, rosin, and calcium resinate which consists in incorporating together substantially 100 parts of undissolved rosin and substantially 100 parts of undissolved rubber, reacting substantially 10 parts of calcium hydroxide with the rosin while the latter is incorporated with the rubber to form calcium resinate, and then reducing the viscosity of the resulting product thereafter by the addition of a suitable solvent.

16. An adhesive cement consisting in its unset state mainly of a solution including magnesium resinate, rosin and rubber.

17. An adhesive cement consisting in its unset state mainly of a solution including barium resinate, rosin and rubber.

18. The process of making an adhesive cement including in its unset state a solution of rubber, rosin and magnesium resinate which consists in incorporating together undissolved rosin and undissolved rubber, reacting an alkaline derivative of magnesium with the rosin while the latter is incorporated with the rubber to form magnesium resinate, and then reducing the viscosity of the resulting product thereafter by the addition of a suitable solvent.

19. The process of making an adhesive cement including in its unset state a solution of rubber, rosin and barium resinate which consists in incorporating together undissolved rosin and undissolved rubber, reacting an alkaline derivative of barium with the rosin while the latter is incorporated with the rubber to form barium resinate, and then reducing the viscosity of the resulting produce thereafter by the addition of a suitable solvent.

20. The method of making a non-aqueous adhesive composition which comprises combining rubber with a saponifiable resinous substance in the presence of a small proportion of a water-insoluble soap.

21. The method of making a non-aqueous adhesive composition which comprises combining rubber with a saponifiable resinous substance in the presence of a metal oxide or hydroxide capable of reacting with fatty acids to form water-insoluble soaps.

22. A non-aqueous adhesive composition comprising rubber, a saponifiable resinous substance, and a small proportion of a water-insoluble soap.

23. A non-aqueous adhesive composition comprising rubber, a saponifiable resin, and a small proportion of a water-insoluble resin soap.

24. An adhesive cement consisting of a solution of rubber, a saponifiable resinous substance, and a small proportion of a water-insoluble soap, in a volatile organic solvent.

25. An adhesive cement consisting of a solution of rubber, a saponifiable resin, and a small proportion of a water-insoluble resin soap, in a volatile hydrocarbon solvent.

WILLIAM F. ZIMMERLI.
ROBERT S. HAVENHILL.